(12) United States Patent  (10) Patent No.: US 7,448,094 B2
Lachance  (45) Date of Patent: Nov. 11, 2008

(54) PLANAR ROBOT WITH PARALLEL AXES AND FIXED MOTORS FOR A WATER JET CUTTER

(75) Inventor: Christian Lachance, Lévis (CA)

(73) Assignee: G.-E. Leblanc, Inc., St-Anselme, Québec (CA)

( * ) Notice: Subject to any disclaimer, the term of this patent is extended or adjusted under 35 U.S.C. 154(b) by 244 days.

(21) Appl. No.: 11/471,527

(22) Filed: Jun. 21, 2006

(65) Prior Publication Data

US 2006/0288833 A1 Dec. 28, 2006

(30) Foreign Application Priority Data

Jun. 27, 2005 (CA) .................................... 2510671

(51) Int. Cl.
*B26F 3/00* (2006.01)
*B26D 7/06* (2006.01)
*B26D 7/00* (2006.01)
*B27B 3/00* (2006.01)
*B27B 19/10* (2006.01)

(52) U.S. Cl. ............................. 83/177; 83/177; 83/401; 83/747

(58) Field of Classification Search ................... 83/177, 83/614, 100, 747, 401, 422, 425.1, 53, 714, 83/713, 436, 318, 411.7, 626, 640
See application file for complete search history.

(56) References Cited

U.S. PATENT DOCUMENTS

| 4,009,652 | A | * | 3/1977 | Anderson | ..................... 99/590 |
| 4,116,097 | A | * | 9/1978 | Graham et al. | ................. 83/155 |
| 4,790,224 | A | * | 12/1988 | Krutilla et al. | .................. 83/53 |
| 5,133,687 | A | * | 7/1992 | Malloy | ........................ 452/149 |
| 6,563,904 | B2 | * | 5/2003 | Wijts et al. | .................... 378/58 |
| 6,843,714 | B2 | * | 1/2005 | Jürs et al. | .................... 452/161 |
| 7,047,857 | B2 | * | 5/2006 | Adkins | ........................ 83/549 |
| 2007/0243806 | A1 | * | 10/2007 | Woods et al. | ............... 452/150 |

FOREIGN PATENT DOCUMENTS

CA 1307719 9/1992

* cited by examiner

*Primary Examiner*—Ghassem Alie
*Assistant Examiner*—Bharat C Patel
(74) *Attorney, Agent, or Firm*—ROBIC

(57) ABSTRACT

A planar robot for cutting products, such as pieces of meat. The product is displaced along a conveyor or positioned onto a working table and is cut by a tool, preferably a water jet. The tool is held by a pair of arms. The arms have first extremities pivotally mounted on mobile bases. The arms also have second extremities pivotally connected to each other. An actuator displaces each of the mobile bases in order to control the position of the cutting tool in a plane above the conveyor or table.

19 Claims, 10 Drawing Sheets

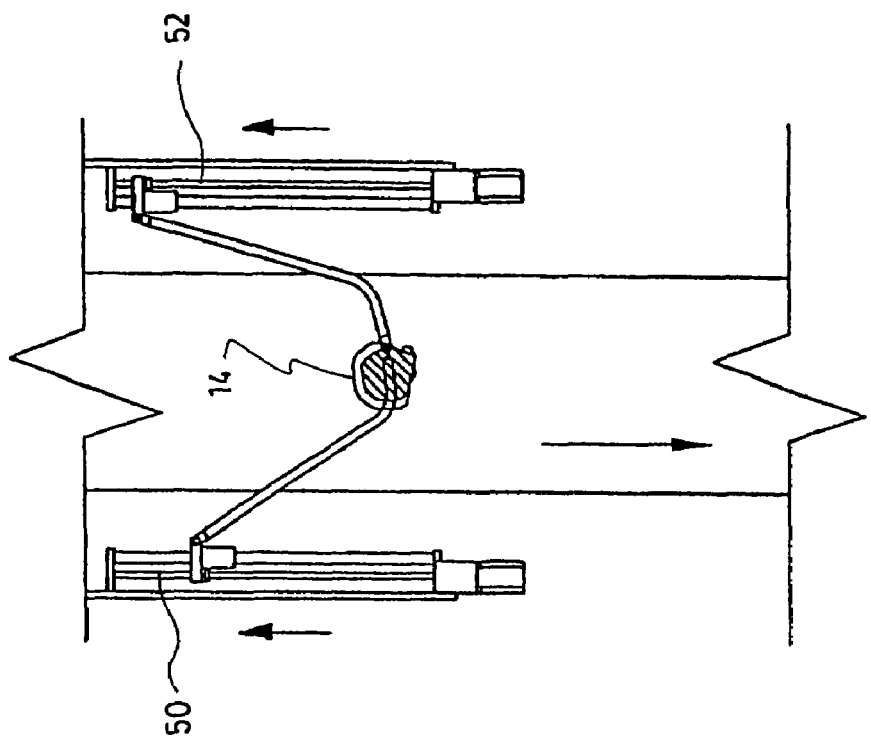
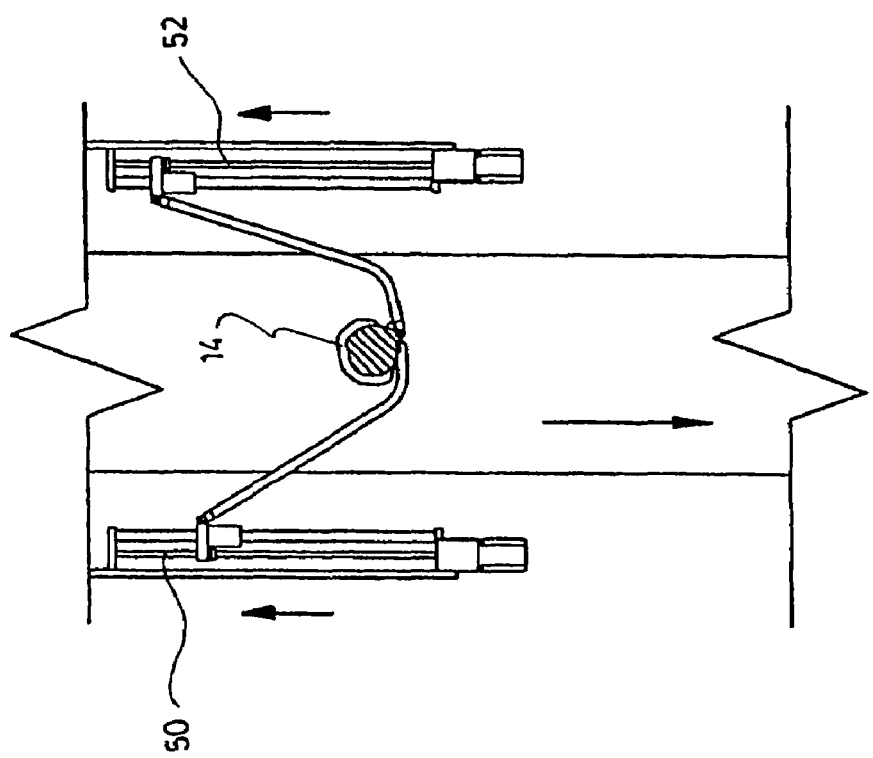

PLANAR ROBOT WITH PARALLEL AXES AND FIXED MOTORS FOR A WATER JET CUTTER

FIELD OF THE INVENTION

The present invention relates to a planar robot. More particularly, it relates to a planar robot especially adapted for cutting products transported on a conveyor or positioned onto a working surface, such as a fixed table.

BACKGROUND OF THE INVENTION

In the prior art, there exist different types of systems for cutting products transported on a conveyor.

For example, Canadian patent no. 1,307,719 belonging to DSI discloses an apparatus and a method for automatic cutting food products. The apparatus comprises a conveyor on which the products to be cut are displaced. The apparatus also comprises means to determine the dimension of the products to be cut. The apparatus further comprises a cutting tool that can travel in a transverse manner with respect to the displacement of the conveyor.

Prior art systems are interesting but often have high inertias in the mechanisms required for the transverse cutting.

Prior art systems are also very difficult to clean.

SUMMARY OF THE INVENTION

The object of the present invention is to provide a planar robot for use to cut products, which comprises a cutting mechanism that is mechanically simple having arms with shapes that allow them to cooperate in a closer manner.

More specifically, a first object of the invention as claimed hereinafter, is to provide a planar robot for cutting products, such as pieces of meat having various shapes, while said products are moved on a conveyor, which comprises
(a) a support structure having an entrance and an exit;
(b) a conveyor for transporting the products to be cut from the entrance to the exit of the conveyor, said conveyor having a first side and a second side opposite to the first side; and
(c) at least one cutting module, each of said at least one cutting module comprising:
(i) a first arm extending above the conveyor and comprising:
a first extremity pivotally mounted on a first mobile base, the first mobile base being connected to the support structure on the first side of the conveyor; and
a second extremity;
(ii) a second arm extending above the conveyor and comprising:
a first extremity pivotally mounted on a second mobile base, the second mobile base being connected to the support structure on the second side of the conveyor; and
a second extremity pivotally connected to the second extremity of the first arm around a junction axis perpendicular to the conveyor;
(iii) a cutting tool fixed on or near the junction axis for cutting the products transported on the conveyor;
(iv) a first actuator connected to the first mobile base for displacing the first mobile base along a first axis generally parallel to the direction of transportation of the products on the conveyor;
(v) a second actuator connected to the second mobile base for displacing the second mobile base along a second axis generally parallel to the first axis; and
(vi) a control system for activating the first and second actuators;

the first actuator and the second actuator, when activated, transmitting linear movements respectively to the first mobile base and to the second mobile base for displacement of the cutting module in a two-dimensional plane above the conveyor for cutting the products while they are transported by the conveyor.

The expression "generally parallel" in paragraphs (iv) and (v) hereinabove, encompass positions that are exactly parallel as well as positions that may be slightly at angle with respect to each other.

A second object of the invention as claimed hereinafter is to provide a planar robot for cutting products positioned on a working surface, such as a fixed table, which comprises:
(a) a support structure with a working surface on which the products to be cut are positioned, said working surface having a first side and a second side opposite to the first side; and
(b) a cutting module comprising:
(i) a first arm extending above the working surface and comprising:
a first extremity pivotally mounted on a first mobile base, the first mobile base being connected to the support structure on the first side of the working surface; and
a second extremity;
(ii) a second arm extending above the working surface and comprising:
a first extremity pivotally mounted on a second mobile base, the second mobile base being connected to the support structure on the second side of the working surface; and
a second extremity pivotally connected to the second extremity of the first arm around a junction axis perpendicular to the working surface;
(iii) a cutting tool fixed on or near the junction axis for cutting the products positioned on the working surface;
(iv) a first actuator connected to the first mobile base for displacing said mobile base along a first axis generally parallel to the first side of the working surface;
(v) a second actuator connected to the second mobile base for displacing the second mobile base along a second axis generally parallel to the second side of the working surface;
(vi) a control system for activating the first and second actuators;

the first actuator and the second actuator when activated, transmitting linear movements respectively to the first mobile base and to the second mobile base for displacement of the cutting module in a two-dimensional plane above the working surface for cutting the products positioned on said working surface.

As may be appreciated, the planar robot according to the present invention has the following advantages.

It is mechanically simple.

Its motors are preferably fixed, which decreases substantially the inertia of the mechanism, decreases the loads on the components and eliminates fatigue damage inflicted to electrical wiring. Furthermore, the size and weight of the motors have no negative impact on the performance of the system.

The shapes of the arms allow the different mechanisms to fit together much more closely.

It is much more sanitary as compared to conventional systems, since its mechanical elements are disposed principally on each side of the working surface or conveyor. Moreover, the system comprises very few components that are difficult to clean.

It has a very low mass in movement (inertia), which facilitates large acceleration required for cutting specific or difficult shapes.

It offers a large work surface with respect to the cluttering of mechanisms.

A non-restrictive description of preferred embodiments of the invention will now be given with reference to the appended drawings.

BRIEF DESCRIPTION OF THE DRAWINGS

FIGS. 3A to F are top plan views showing the manner in which the cutting head mounted at the junction of the arms can be displaced as a function of the displacement given to the arms.

DESCRIPTION OF PREFERRED EMBODIMENTS

Figure 1:
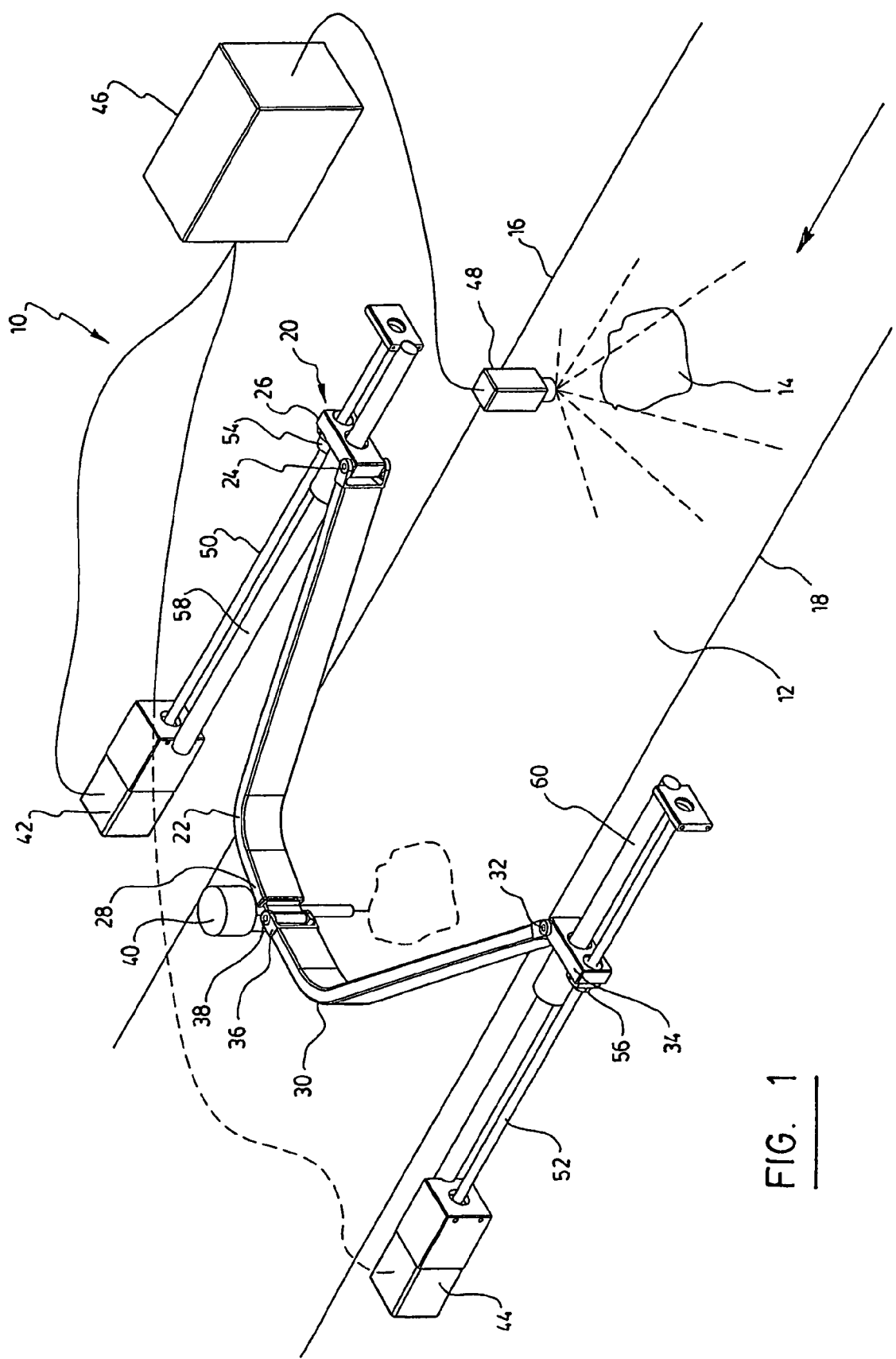
FIG. 1 is a perspective view of a planar robot especially adapted for cutting pieces of meat such as pork cutlets, with a water jet.
Figure 2:
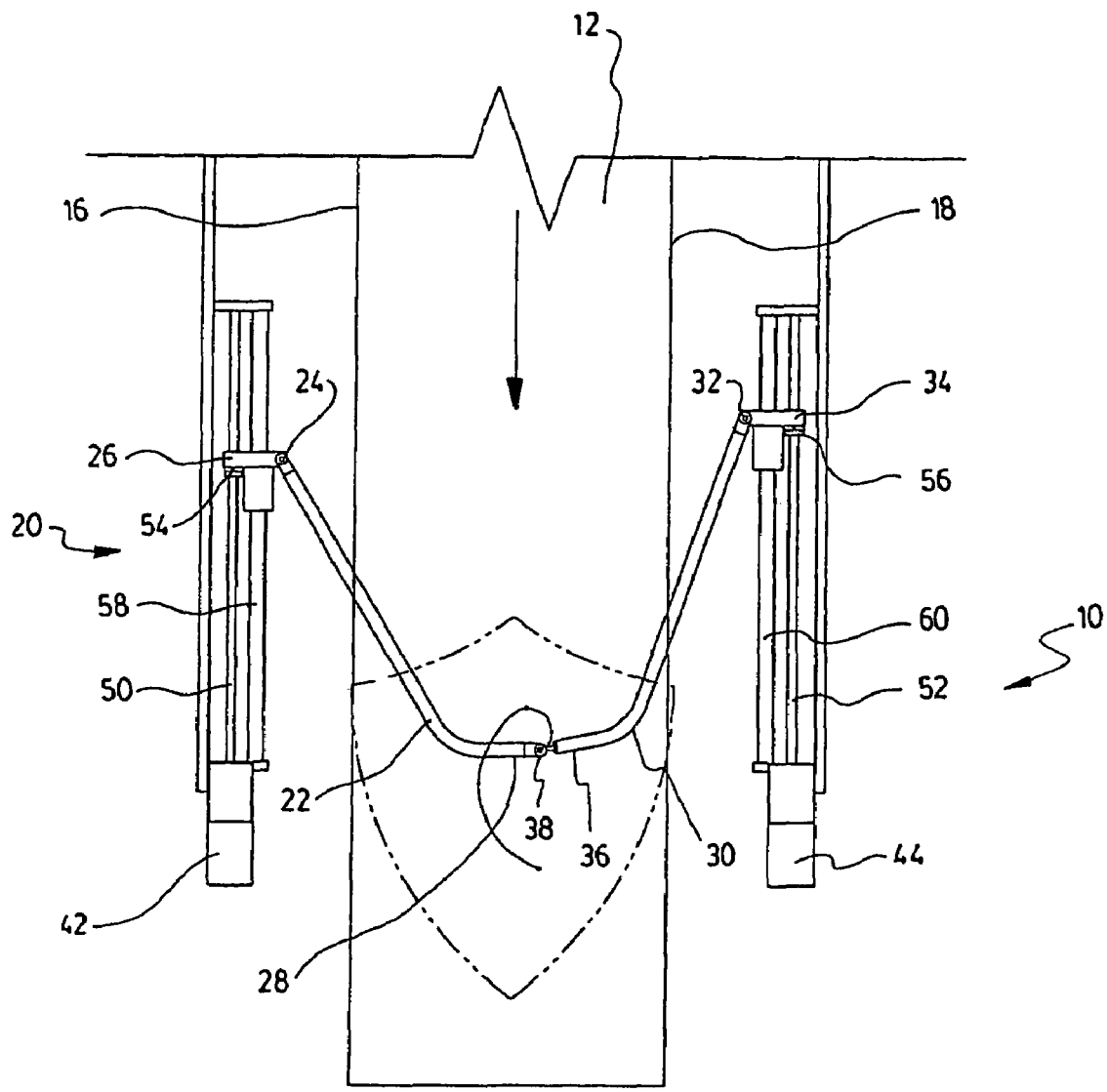
FIG. 2 is a top plan view of the robot shown in FIG. 1, illustrating a cutting trajectory.
Figure 3D:
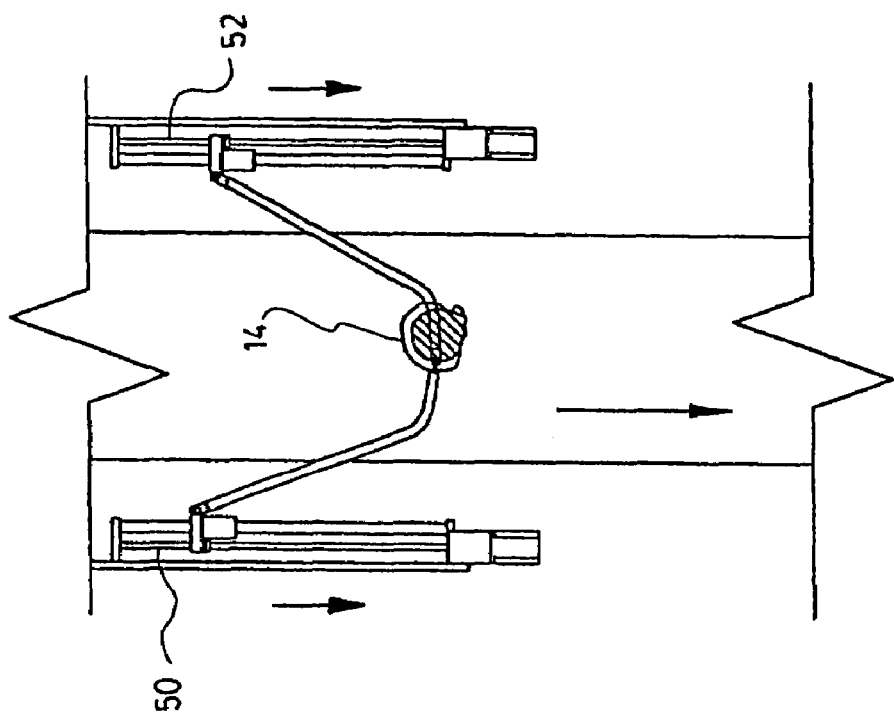
Figure 3C:
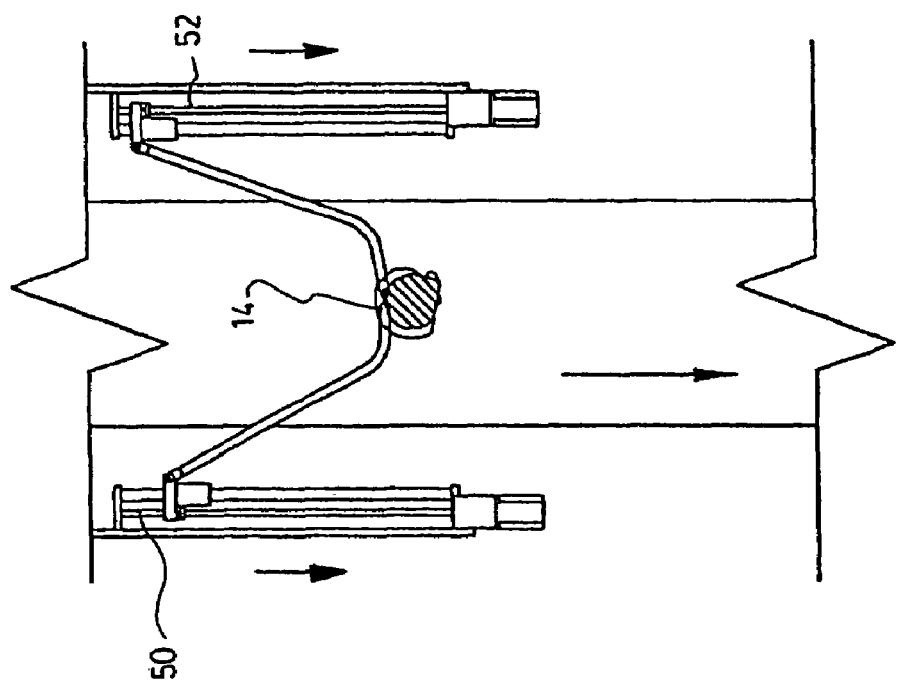
Figure 3F:
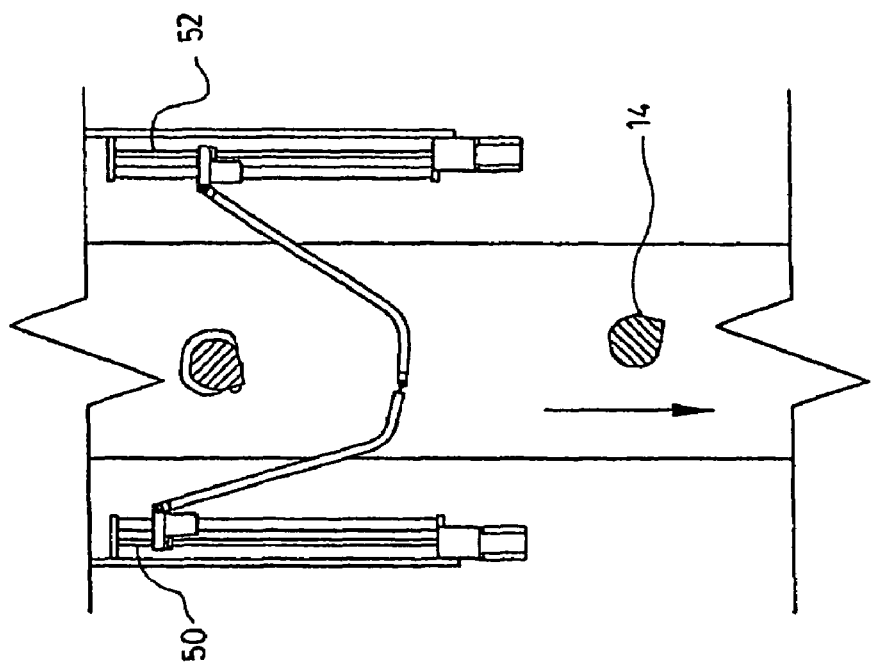
Figure 3E:
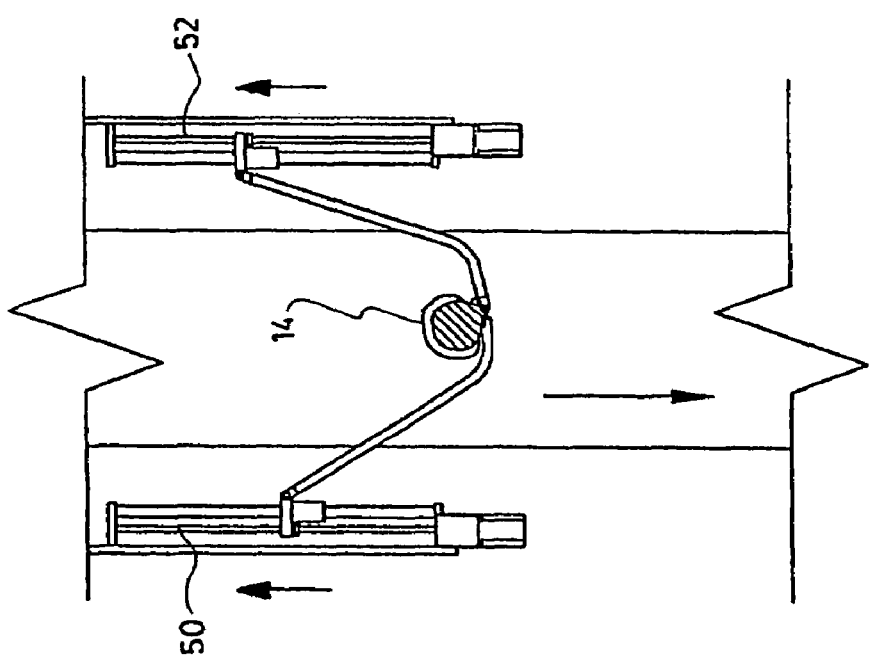
Figure 4:
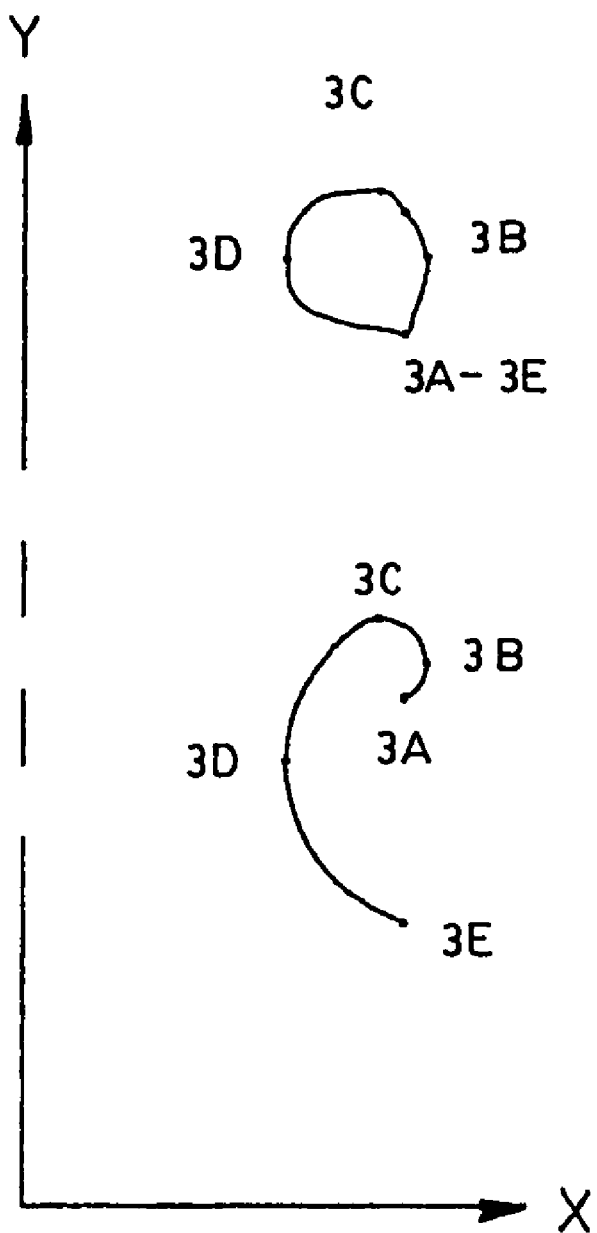
FIG. 4 is an illustration of the trajectory that the cutting head must follow when the conveyor is in a stop position or a running position, in order to eliminate fat around a pork cutlet.

The planar robot 10 for cutting products according to the preferred embodiment of the invention as shown in FIG. 1, comprises a support structure having an entrance and an exit.

The robot comprises a conveyor 12 extending within the support structure for transporting the products 14 to be cut from the entrance to the exit of the conveyor. As shown, the conveyor 12 has a first side 16 and a second side 18 opposite the first side 16.

The robot also comprises at least one cutting module 20. This cutting module 20 as it is illustrated, comprises a first generally L-shaped arm 22 extending above the conveyor 12.

The first arm 22 comprises a first extremity 24 pivotally mounted on a first mobile base 26, the first mobile base 26 being connected to the support structure on the first side 16 of the conveyor 12. The first arm 22 comprises also a second extremity 28.

The cutting module 20 comprises a second generally L-shaped arm 30 standing above the conveyor 12. This second arm 30 comprises a first extremity 32 pivotally mounted on a second mobile base 34, that is connected to the support structure on the second side 18 of the conveyor 12.

The second extremity 36 of the second arm 30 is pivotally connected to the second extremity 28 of the first arm 22 around a junction axis 38 perpendicular to the conveyor.

The module also comprises a cutting tool 40 fixed on or near the junction axis 38 for cutting the products traveling on the conveyor 12.

The module further comprises a first actuator 42 and a second actuator 44 connected respectively to the first mobile base 26 and the second mobile base 34 for displacement of the first mobile base 26 and the second mobile base 34 along axis parallel to the direction of transportation of the product 14 on the conveyor 12.

The module also comprises a control system 46 for activating the first 42 and second actuator 44. The actuators 42, 44 when activated transmit a linear movement to the mobile bases 26, 34 for displacement of the cutting module 40 in a two-dimensional plane above the conveyor 12 for cutting the products while they are transported on the conveyor 12.

Preferably, the robot further comprises a detector 48 to collect information on the product 14 to be cut by the conveyor 12. This detector 48 is connected to the control system 46 to transmit to the cutting module(s) information on the products 14 that are traveling.

Preferably, the first and second actuators 42, 44 each comprise a worm screw 50, 52 actuated by a motor. These worm screws 50, 52 extend along the travel axis of the actuators 42, 44. The first extremity of each of the adjacent arms 22, 30 is mounted on to the corresponding worm screw via a traveling nut 54, 56, which ensures displacement of the arm when the motor is activated.

In the illustrated embodiments, the arms 22, 30 are of a same length. However, depending on the kind of products to be cut or their position on the conveyor, the arms could be of different lengths.

It is worth noting also that the above-mentioned worm screws could be replaced by a system of belts or rack and pinions or by any other types of mechanisms that would generate a linear movement to the mobile bases.

Preferably, each traveling nut 54, 56 is connected through the mobile base 26, 34 to a linear guide 58, 60.

Preferably also, the cutting tool 40 comprises a cutting head generating a cutting water jet. However, the cutting tool 40 could alternatively be a laser, an ultrasonic cutter or any other type of cutting tool.

In another preferred embodiment shown in FIGS. 6 to 9, the planar robot 10 comprises several cutting modules 70, 72, 74, 76, 78 serially positioned one after the other along the length of the conveyor 12.

Figure 5:
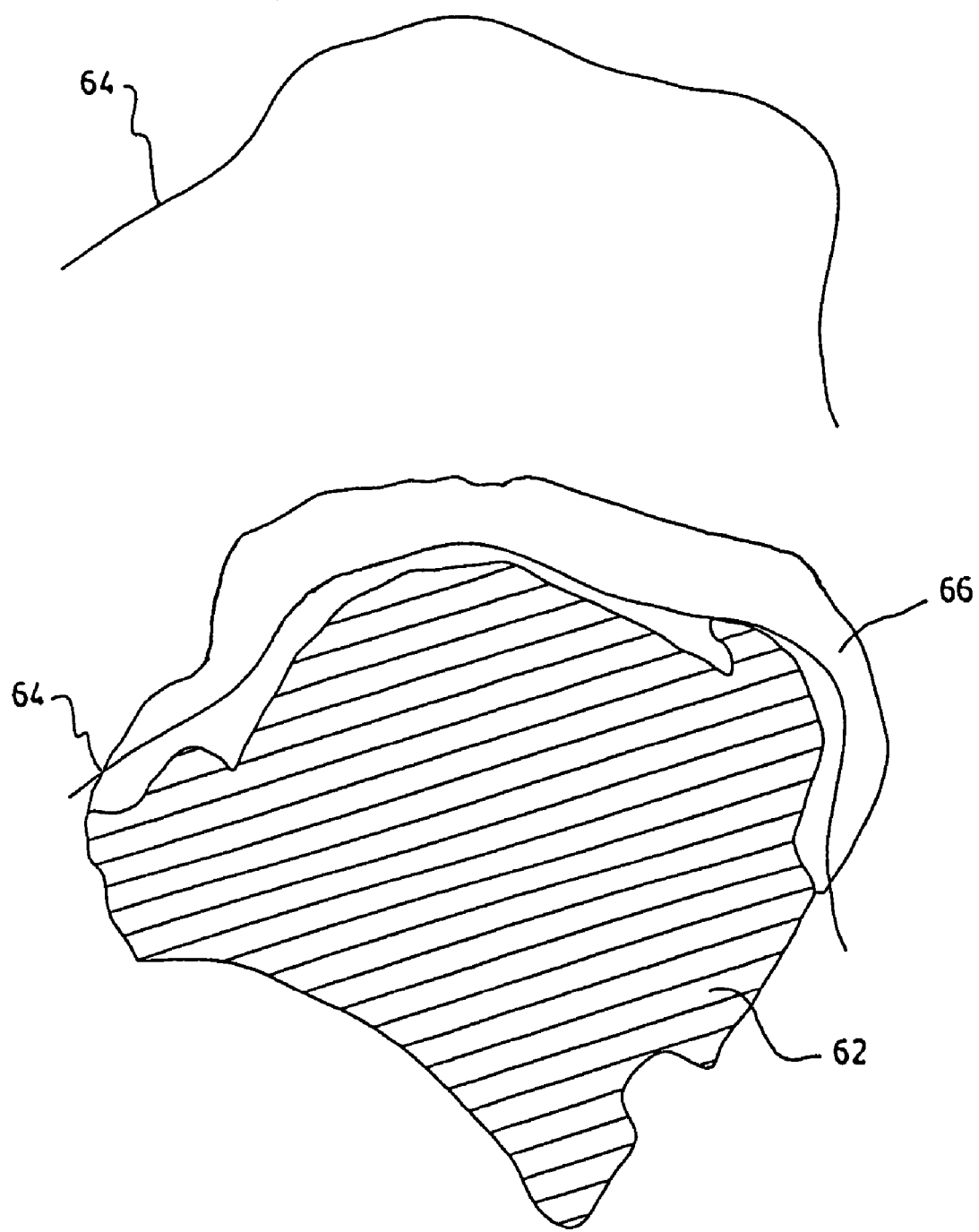
FIG. 5 is a top plan view of a cutlet and of the cutting trajectory that must be followed to cut the fat on one side of the cutlet.
Figure 6:
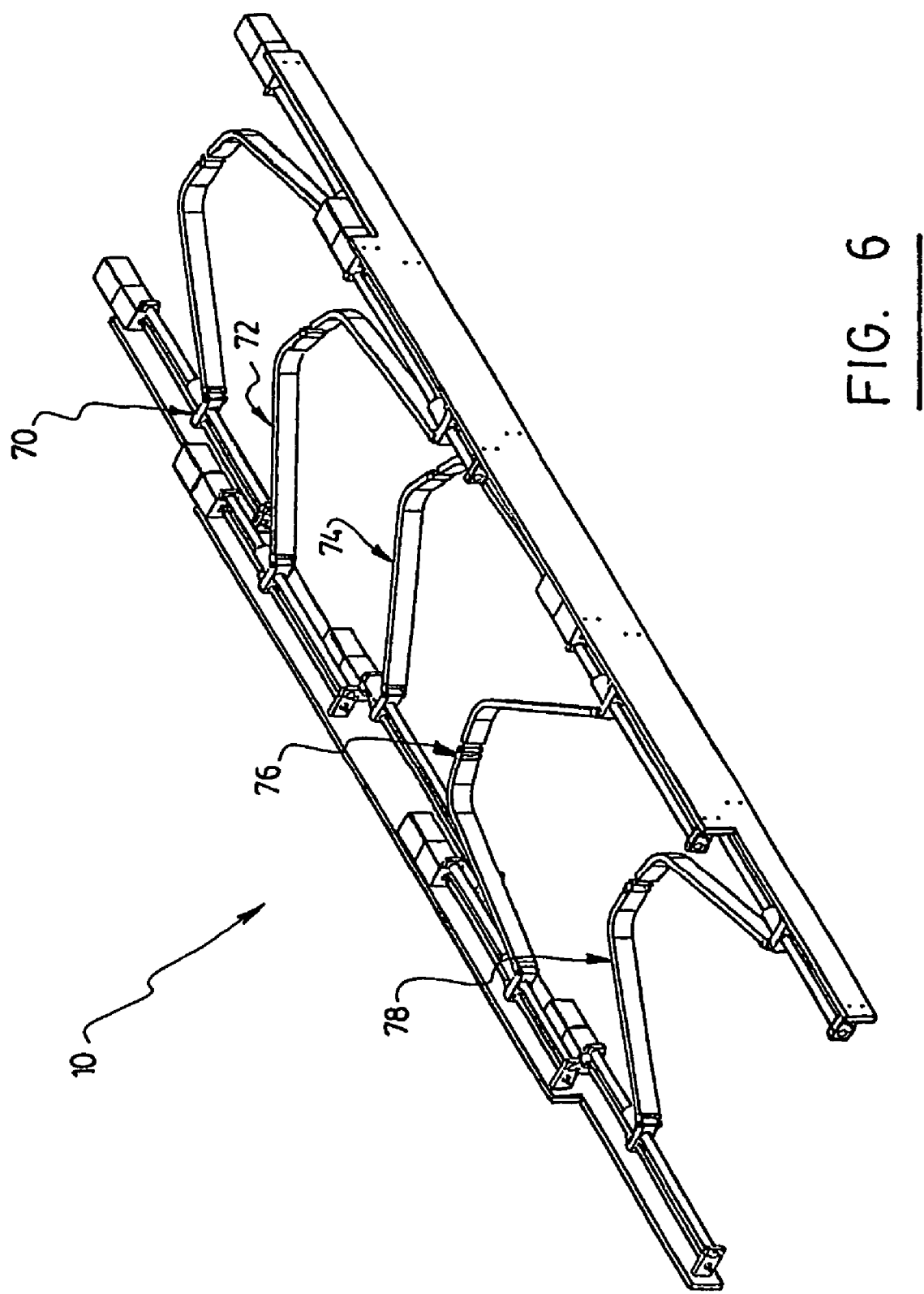
FIGS. 6, 7, 8 and 9 are perspective, top, side and front views of a planar robot comprising five cutting modules mounted in a linear fashion on a same conveyor.
Figure 7:
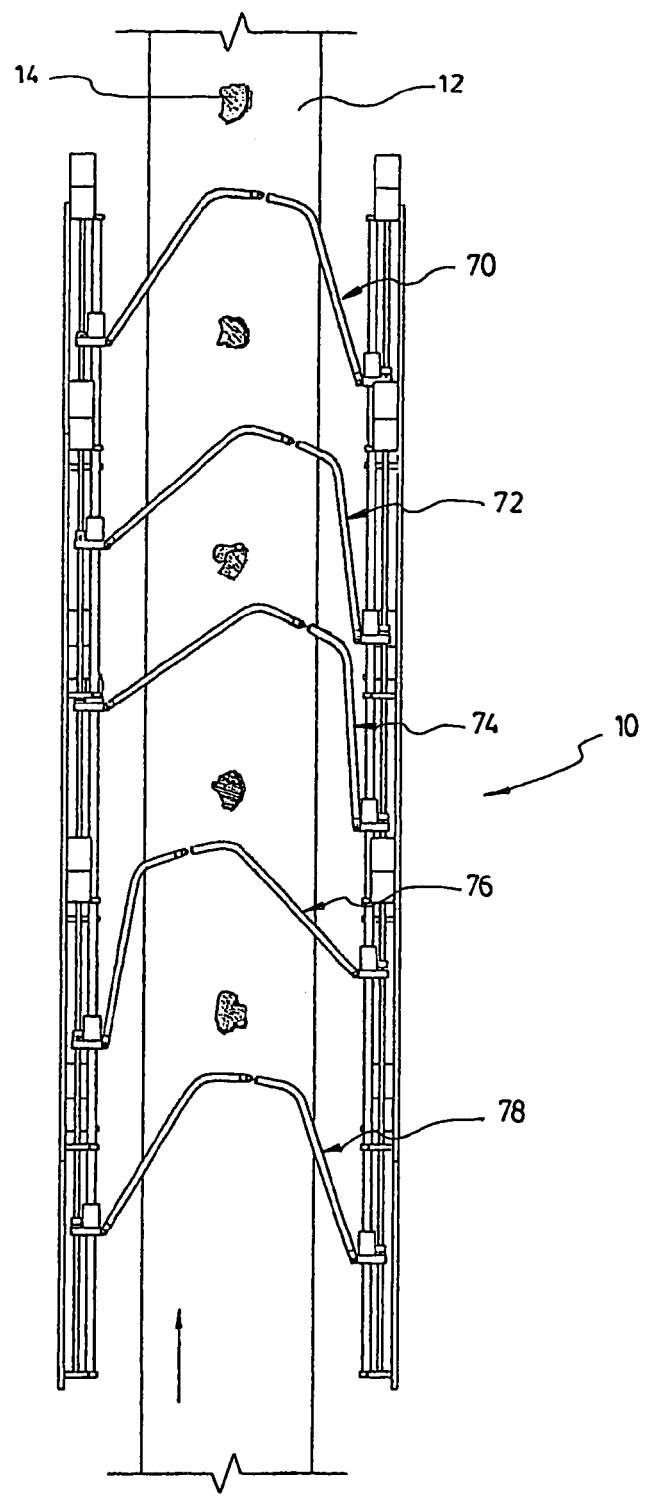
Figure 8:
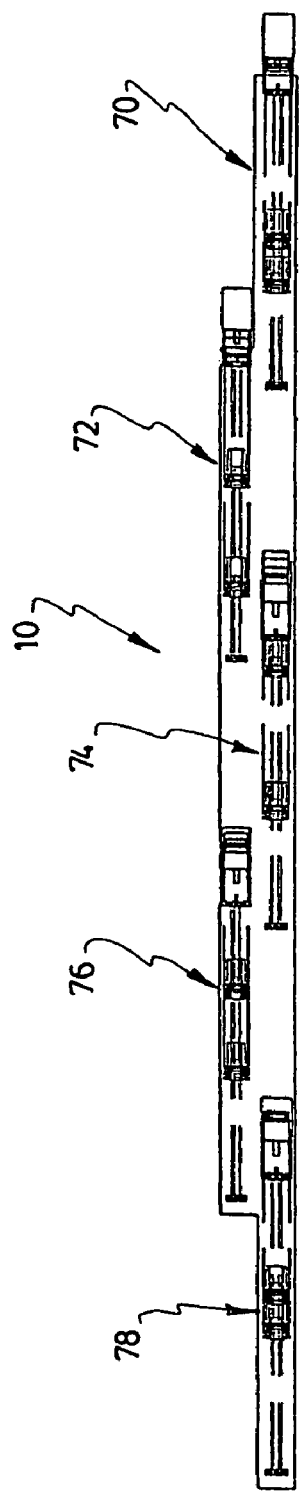
Figure 9:
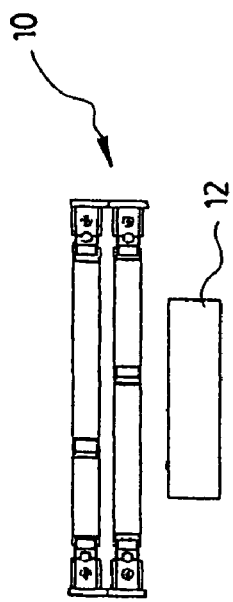

As aforesaid, the products to be cut can be food products, such as pieces of meat. FIG. 5 given for illustration purposes, is a top plan view of a pork cutlet 62 and of the cutting trajectory 64 that must be followed to cut the fats 66 on one side of this cutlet.

As illustrated in FIGS. 3A to 3F, the control system controls the position of the cutting head by activation of the two worm screws 52, 54 having parallel axis. As may be noticed, the worm screws 50, 52 are independently activated by their respective motor.

The traveling nuts 54, 56 convert the rotational movement of the worm screws into linear movement along axis #1 and #2. The traveling nuts are supported by linear guides 58, 60. The arms 22, 30 that are connected to the traveling nuts and are joined through a rotoidal joint having an axis perpendicular to the plane of the screws, may thus be given different angular positions which allow proper positioning of the cutting head in a two-dimensional plane (X, Y).

FIGS. 3A to 3F and 4 illustrate examples of cutting trajectories that can be achieved by the control system.

At position 3A, the product to be cut 14 enters the cutting zone, with the cutting head already positioned to start the cut. The two lateral axis move along the Y+ direction. The rotational velocity of the worm screw 52 causing a displacement along the axis #2 is superior to that of the worm screw 50 causing a displacement along the axis #1. Consequently, the cutting head moves along the X+ Y+ direction.

At position 3B, the rotational velocity of the worm screw 50 along axis #1 exceeds the rotational speed of the worm screw 52 along axis #2. The cutting head therefore displaces itself along the X− Y+ direction.

At position 3C, rotations of worm screws 50 and 52 are inverted. So, the traveling nuts travel towards Y− and the cutting head moves in the X−Y− direction.

At position 3D, the displacement speed along axis #1 is superior to that along axis #2. Consequently, the cutting head moves in the X+Y− direction.

At position 3E, the cutting head finishes its trajectory. Both axis #1 and #2 produce a displacement in the Y+ direction. The cutting head moves in the Y+ direction to position itself for the next cutting operation.

The cutting mechanism can be used with a conveyor in continuous movement or with a conveyor which stops movement during cutting of the product. Alternatively, the cutting mechanism could be used on a working support, such as a fixed table. The basic structure would be substantially the same as illustrated hereinabove the only difference being in that a table would be used instead of the illustrated conveyor 12.

What is claimed is:

1. A planar robot for cutting products, comprising:
   (a) a support structure having an entrance and an exit;
   (b) a conveyor for transporting the products to be cut from the entrance to the exit of the conveyor along a given direction, said conveyor having a first side and a second side opposite to the first side; and
   (c) at least one cutting module, each of said at least cutting module comprising:
   (i) a first arm extending above the conveyor and comprising:
      a first extremity pivotally mounted on a first mobile base, the first mobile base being connected to the support structure on the first side of the conveyor; and
      a second extremity;
   (ii) a second arm extending above the conveyor and comprising:
      a first extremity pivotally mounted on a second mobile base, the second mobile base being connected to the support structure on the second side of the conveyor; and
      a second extremity pivotally connected to the second extremity of the first arm around a junction axis perpendicular to the conveyor;
   (iii) a cutting tool fixed on or near the junction axis for cutting the products transported on the conveyor;
   (iv) a first actuator connected to the first mobile base for displacing the first mobile base along a first axis generally parallel to the direction of transportation of the products on the conveyor;
   (v) a second actuator connected to the second mobile base for displacing the second mobile base along a second axis generally parallel to the first axis; and
   (vi) a control system for activating the first and second actuators;
   the first actuator and the second actuator when activated, transmitting linear movements respectively to the first mobile base and to the second mobile base for displacement of the cutting module in a two-dimensional plane above the conveyor for cutting the products while they are transported on the conveyor.

2. The planar robot according to claim 1, which further comprises:
   a detector to collect information on the product to be cut on the conveyor, said detector being connected to the control system of said at least one cutting module to transmit to said at least one cutting module the so-collected information on the product.

3. The planar robot according to claim 1, wherein the first and second actuators each comprise a worm screw operated by a motor, said worm screw extending along the placement axis of the actuator, the first extremity of the adjacent arm being mounted on said worm screw through a travelling nut which ensures displacement of the arm when the motor is activated.

4. The planar robot according to claims 3, wherein each travelling nut is connected through the corresponding mobile base to a linear guide.

5. The planar robot according to claim 1, wherein the cutting tool comprises a cutting head generating a water jet.

6. The planar robot according to claim 1, which comprises several of said at least one cutting module placed serially one after the other along the conveyor.

7. The planar robot according to claim 2, wherein the first and second actuators each comprise a worm screw operated by a motor, said worm screw extending along the placement axis of the actuator, the first extremity of the adjacent arm being mounted on said worm screw through a travelling nut which ensures displacement of the arm when the motor is activated, each travelling nut being connected through the corresponding mobile base to a linear guide.

8. The planar robot according to claim 7, wherein the cutting tool comprises a cutting head generating a water jet.

9. The planar robot according to claim 8, which comprises several of said at least one cutting module placed serially one after the other along the conveyor.

10. The planar robot according to claim 1, wherein the products to be cut are pieces of meat.

11. The planar robot according to claim 7, wherein the products to be cut are pieces of meat.

12. The planar robot according to claim 8, wherein the products to be cut are pieces of meat.

13. A planar robot for cutting products, comprising:
   (a) a support structure with a working surface on which the products to be cut are positioned, said working surface having a first side and a second side opposite to the first side; and
   (b) a cutting module comprising:
   (i) a first arm extending above the working surface and comprising:
      first extremity pivotally mounted on a first mobile base, the first mobile base being connected to the support structure on the first side of the working surface; and
      a second extremity;
   (ii) a second arm extending above the working surface and comprising:
      a first extremity pivotally mounted on a second mobile base, the second mobile base being connected to the support structure on the second side of the working surface; and
      a second extremity pivotally connected to the second extremity of the first arm around a junction axis perpendicular to the working surface;
   (iii) a cutting tool fixed on or near the junction axis for cutting the products positioned on the working surface;
   (iv) a first actuator connected to the first mobile base for displacing said mobile base along a first axis generally parallel to the first side of the working surface;
   (v) a second actuator connected to the second mobile base for displacing the second mobile base along a second axis generally parallel to the second side of the working surface;
   (vi) a control system for activating the first and second actuators;

the first actuator and the second actuator when activated, transmitting linear movements respectively to the first mobile base and to the second mobile base for displacement of the cutting module in a two-dimensional plane above the working surface for cutting the products positioned on said working surface.

14. The planar robot according to claim 13, which further comprises:

a detector to collect information on the product to be cut on the working surface, said detector being connected to the control system of said at least one cutting module in which to transmit to said at least one cutting module the so-collected information on the product.

15. The planar robot according to claim 13, wherein the first and second actuators each comprise a worm screw operated by a motor, said worm screw extending along the placement axis of the actuator, the first extremity of the adjacent arm being mounted on said worm screw through a travelling nut which ensures displacement of the arm when the motor is activated.

16. The planar robot according to claim 13, wherein the cutting tool comprises a cutting head generating a water jet.

17. The planar robot according to claim 14, wherein the first and second actuators each comprise a worm screw operated by a motor, said worm screw extending along the placement axis of the actuator, the first extremity of the adjacent arm being mounted on said worm screw through a travelling nut which ensures displacement of the arm when the motor is activated.

18. The planar robot according to claim 17, wherein the cutting tool comprises a cutting head generating a water jet.

19. The planar robot according to claim 18, wherein the products to be cut are pieces of meat.

\* \* \* \* \*